United States Patent
Son et al.

(10) Patent No.: US 10,330,982 B2
(45) Date of Patent: Jun. 25, 2019

(54) CURVED DISPLAY DEVICE HAVING DOMAINS OF LIQUID CRYSTAL MOLECULES ALIGNED IN DIFFERENT DIRECTIONS

(71) Applicant: Samsung Display Co., Ltd., Yongin (KR)

(72) Inventors: Jeongman Son, Suwon-si (KR); Minwook Park, Asan-si (KR); JinYoung Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 139 days.

(21) Appl. No.: 14/553,037

(22) Filed: Nov. 25, 2014

(65) Prior Publication Data

US 2015/0234239 A1 Aug. 20, 2015

(30) Foreign Application Priority Data

Feb. 14, 2014 (KR) ........................ 10-2014-0017339

(51) Int. Cl.
*G02F 1/1335* (2006.01)
*G02F 1/1337* (2006.01)
*G02F 1/1343* (2006.01)

(52) U.S. Cl.
CPC .. *G02F 1/133753* (2013.01); *G02F 1/133512* (2013.01); *G02F 2001/133757* (2013.01); *G02F 2001/134345* (2013.01)

(58) Field of Classification Search
CPC combination set(s) only.
See application file for complete search history.

(56) References Cited

U.S. PATENT DOCUMENTS

| | | | |
|---|---|---|---|
| 6,738,120 B1* | 5/2004 | Song | G02F 1/133707 349/110 |
| 2006/0061722 A1* | 3/2006 | Jun | G02F 1/133707 349/139 |

(Continued)

FOREIGN PATENT DOCUMENTS

| | | |
|---|---|---|
| CN | 102213872 | 10/2011 |
| JP | 2010-169814 | 8/2010 |

(Continued)

OTHER PUBLICATIONS

Office Action dated Feb. 27, 2019 issued in Chinese Patent Application No. 201510079356.3.

*Primary Examiner* — Lauren Nguyen
(74) *Attorney, Agent, or Firm* — H.C. Park & Associates, PLC

(57) ABSTRACT

A curved display device including a display substrate, an opposite substrate, a liquid crystal layer, a pixel electrode, a common electrode, and a light blocking layer. The display substrate includes pixel areas included in a display area, and is curved along a first direction. The opposite substrate faces the display substrate and is coupled to the display substrate to be curved together with the display substrate. Domains are defined in each pixel area and arranged in a second direction crossing the first direction. Liquid crystal molecules in a first set of two domains, which are sequentially arranged and disposed adjacent to the light blocking layer, are aligned toward a first side of the display area, and liquid crystal molecules in a second set of two domains facing the first set of two domains are aligned toward the second side of the display area.

22 Claims, 12 Drawing Sheets

(56) References Cited

U.S. PATENT DOCUMENTS

| | | | |
|---|---|---|---|
| 2009/0161048 A1* | 6/2009 | Satake | G02F 1/133305 |
| | | | 349/110 |
| 2011/0102721 A1* | 5/2011 | Enomoto | G02F 1/133536 |
| | | | 349/137 |
| 2011/0242443 A1 | 10/2011 | Choi et al. | |
| 2012/0033170 A1* | 2/2012 | Kim | G02F 1/1393 |
| | | | 349/139 |
| 2012/0200795 A1 | 8/2012 | Takatori | |
| 2012/0280895 A1 | 11/2012 | Yeh et al. | |
| 2012/0293750 A1 | 11/2012 | Yeh et al. | |
| 2013/0010219 A1 | 1/2013 | Yeh et al. | |
| 2015/0036073 A1 | 2/2015 | Im et al. | |

FOREIGN PATENT DOCUMENTS

| | | |
|---|---|---|
| KR | 10-2010-0072682 | 7/2010 |
| KR | 10-2011-0071595 | 6/2011 |
| KR | 10-2011-0111212 | 10/2011 |
| KR | 10-2011-0118001 | 10/2011 |
| KR | 10-2015-0016014 | 2/2015 |

* cited by examiner

CURVED DISPLAY DEVICE HAVING DOMAINS OF LIQUID CRYSTAL MOLECULES ALIGNED IN DIFFERENT DIRECTIONS

CROSS-REFERENCE TO RELATED APPLICATION

This application claims priority from and the benefit of Korean Patent Application No. 10-2014-0017339, filed on Feb. 14, 2014, which is hereby incorporated by reference for all purposes as if fully set forth herein.

BACKGROUND

Field

Exemplary embodiments of the present disclosure relate to a curved display device. More particularly, exemplary embodiments of the present disclosure relate to a curved display device having a curved display area.

Discussion of the Background

A flat panel display device has been widely applied to various information-processing devices, such as a television set, a monitor, a notebook computer, a mobile phone, etc., to display an image. In recent years, a curved display device has been developed to improve a three-dimensional effect, sense of immersion, and presence of the image provided to a viewer.

The above information disclosed in this Background section is only for enhancement of understanding of the background of the inventive concept, and, therefore, it may contain information that does not constitute prior art.

SUMMARY

Exemplary embodiments provide a curved display device having improved display quality.

Additional aspects will be set forth in the detailed description which follows, and, in part, will be apparent from the disclosure, or may be learned by practice of the inventive concept.

Exemplary embodiments of the inventive concept disclose a curved display device including a display substrate, an opposite substrate, a liquid crystal layer, a pixel electrode, a common electrode, and a light blocking layer. The display substrate includes pixel areas defined in a display area, and is curved along a first direction when viewed in a plan view. The opposite substrate faces the display substrate, is coupled to the display substrate, and is curved along the first direction together with the display substrate.

The liquid crystal layer is interposed between the display substrate and the opposite substrate and the pixel electrode is disposed in each of the pixel areas. The common electrode is disposed on the opposite substrate and is configured to form an electric field in cooperation with the pixel electrode, and the light blocking layer is disposed on one of the display substrate and the opposite substrate and is configured to block light.

Domains are defined in each of the pixel areas, and are arranged in a second direction crossing the first direction. Among the domains, liquid crystal molecules in a first set of two domains, which are sequentially arranged and disposed adjacent to the light blocking layer, are aligned in a direction toward one side of the display area, and liquid crystal molecules in a second set of two domains, which face the first set of two domains while the light blocking layer is disposed between the first and second sets of two domains, are aligned in a direction toward the other side of the display area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

DETAILED DESCRIPTION OF THE ILLUSTRATED EMBODIMENTS

Figure 1A:
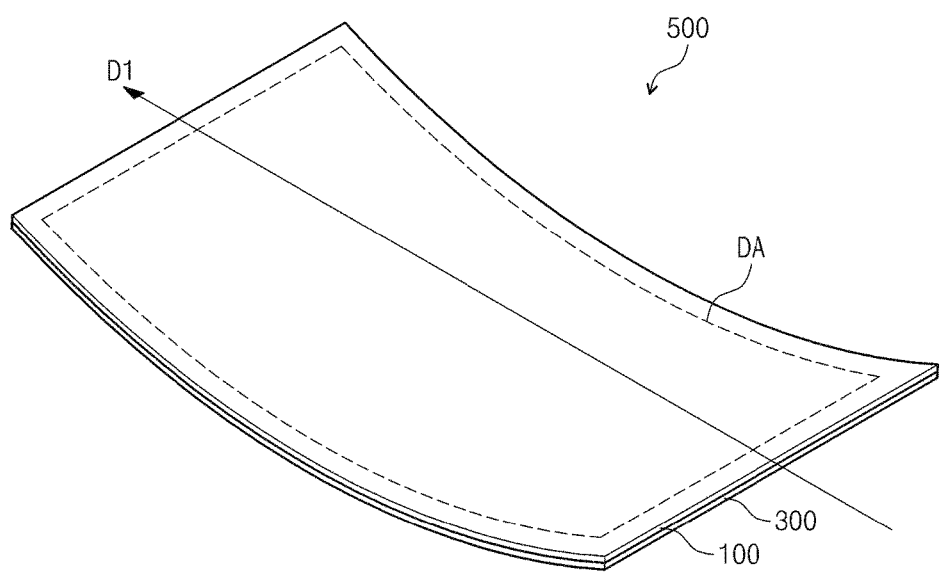
FIG. 1A is a perspective view showing a curved display device according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the present invention will be explained in detail with reference to the accompanying drawings.

Figure 1B:
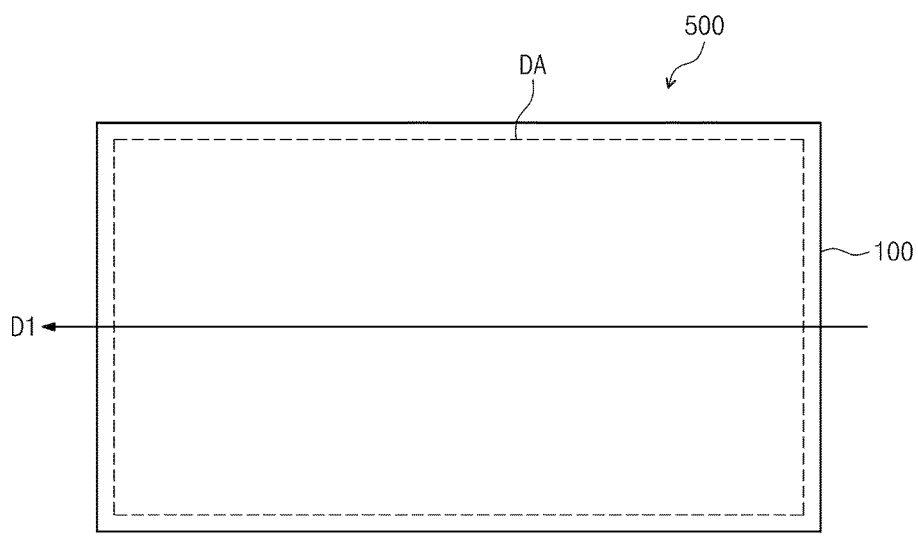
FIG. 1B is a plan view showing the curved display device shown in FIG. 1A.
Figure 1C:
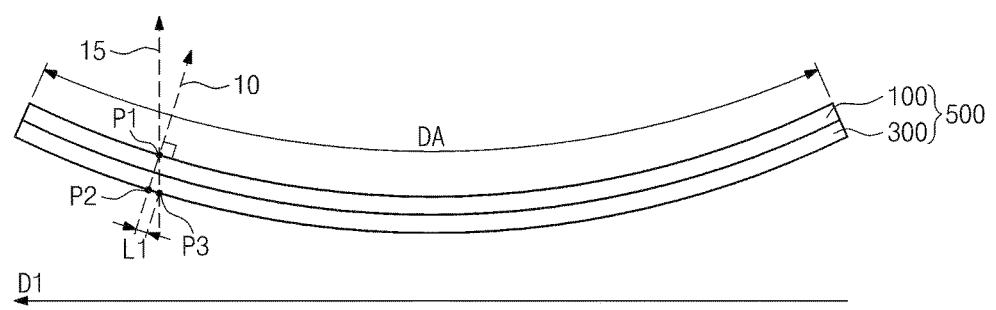
FIG. 1C is a side view showing the curved display device shown in FIG. 1A.

Referring to FIGS. 1A, 1B, and 1C, the curved display device 500 includes a display area DA in which an image is displayed and has a curved shape. Accordingly, the curved display device 500 may display the image having an enhanced three-dimensional effect, a sense of immersion and presence using the curved display area DA.

Figure 3A:
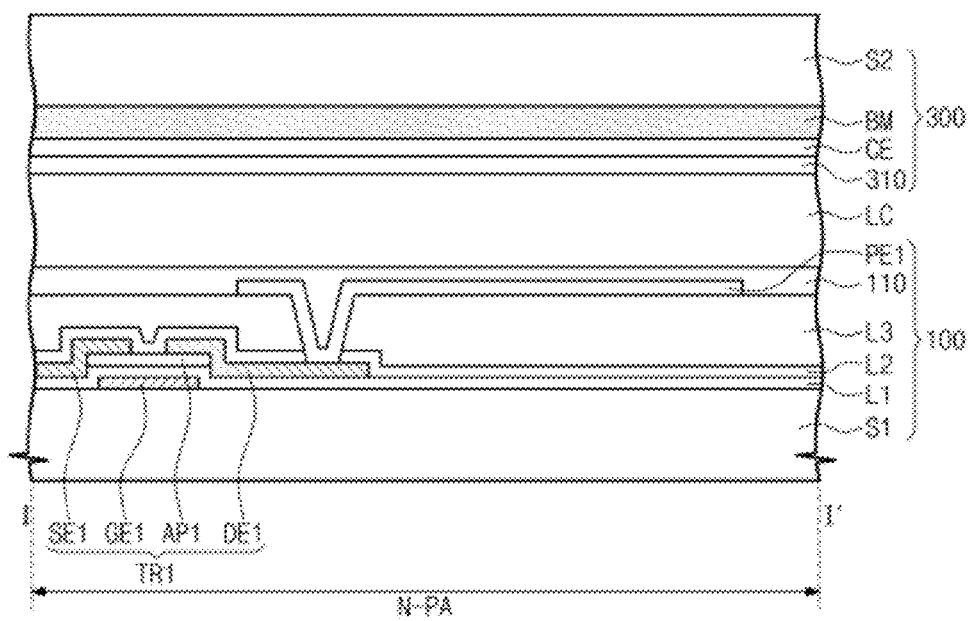
FIG. 3A is a cross-sectional view taken along a line I-I' of FIG. 2.

The curved display device 500 may be, a liquid crystal display device. The curved display device 500 includes a display substrate 100, an opposite substrate 300, and a liquid crystal layer LC disposed therebetween, as shown in FIG. 3A. The opposite substrate 300 faces the display substrate 100 and is coupled to the display substrate 100, and the liquid crystal layer is disposed between the display substrate 100 and the opposite substrate 300.

The curved display device 500 may further include other elements, in addition to the display substrate 100 and the opposite substrate 300. For instance, the curved display device 500 may further include a backlight assembly (not shown) to provide light to the display substrate 100 and the opposite substrate 300.

According to another exemplary embodiment, the curved display device 500 may be an organic electroluminescent display device. In this case, the display substrate 100 includes pixels, each including an anode, a cathode, and an organic light emitting layer disposed between the anode and the cathode, and the opposite substrate 300 is coupled to the display substrate 100 to seal the pixels.

In the present exemplary embodiment, a portion or all of the curved display device 500 is curved along a first direction D1 on a plane surface, and the first direction D1 is substantially in parallel to a longitudinal direction of the curved display device 500. Accordingly, the display area DA has the curved shape along the first direction D1. In addition, the opposite substrate 300 has the same curved shape as that of the display substrate 100.

As shown in FIG. 1C, when a first point P1 is defined at a curved portion of the display substrate 100 on the side surface of the display substrate 100, a normal line 10 crossing the first point P1 crosses a second point P2 of the opposite substrate 300. In addition, a gaze line 15, which is substantially in parallel to a user's view direction, is defined at the first point P1, and the gaze line 15 crosses a third point P3 of the opposite substrate 300. In this case, because the display substrate 100 and the opposite substrate 300 have the curved shape, the second point P2 may be different from the third point P3 in the opposite substrate 300.

As described above, a phenomenon in which a distance occurs between the second point P2 and the third point P3 is called a misalignment between the display substrate 100 and the opposite substrate 300 due to the curved shape of the display substrate 100 and the opposite substrate 300. Hereinafter, a structure of the curved display device 500, which prevents a reduction in display quality of the image displayed in the display area DA of the curved display device 500 as a result of the misalignment, will be described. In addition, a structure of the curved display device 500, which prevents a horizontal line causing a reduction of the display quality, will be described.

Figure 2:
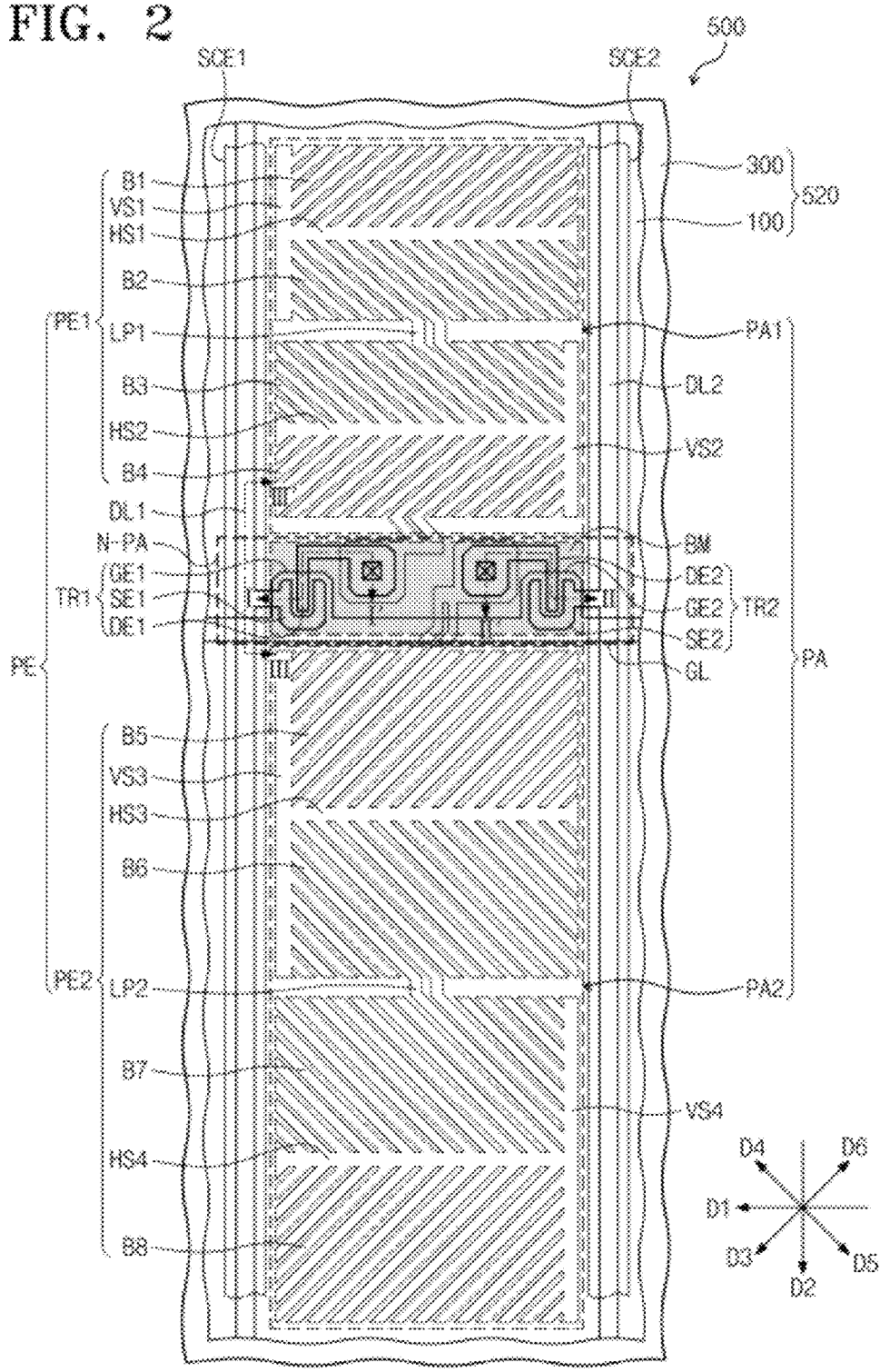
FIG. 2 is a plan view showing a pixel of the curved display device shown in FIG. 1A.
Figure 3B:
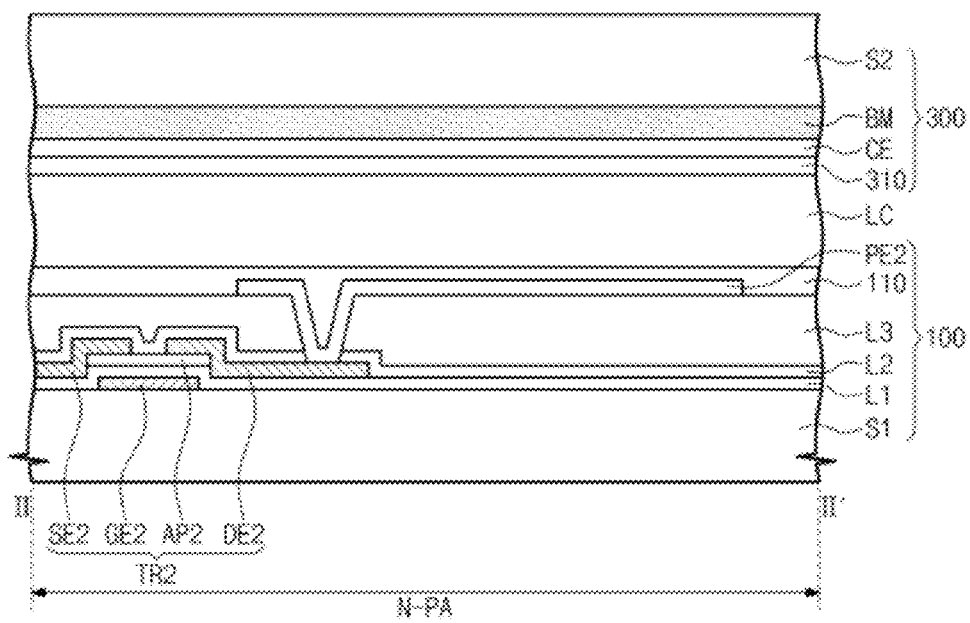
FIG. 3B is a cross-sectional view taken along a line II-II' of FIG. 2.
Figure 3C:
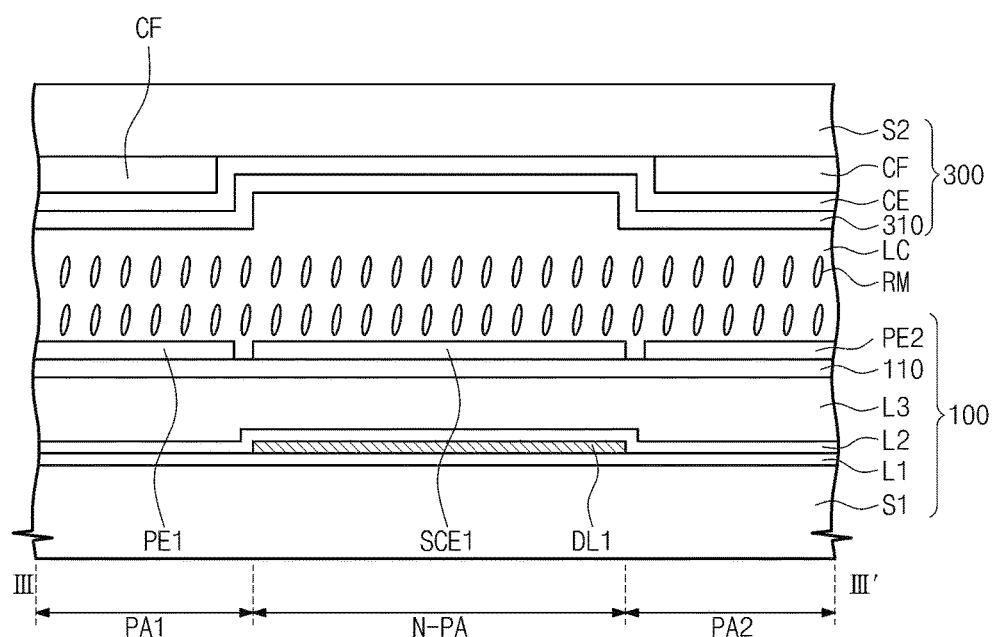
FIG. 3C is a cross-sectional view taken along a line III-III' of FIG. 2.

FIG. 2 is a plan view showing a pixel of the curved display device 500 shown in FIG. 1A, FIG. 3A is a cross-sectional view taken along a line I-I' of FIG. 2, FIG. 3B is a cross-sectional view taken along a line II-II' of FIG. 2, FIG. 3C is a cross-sectional view taken along a line III-III' of FIG. 2.

The curved display device 500 includes the pixels arranged in pixel areas, but only one pixel area PA and a pixel electrode PE disposed in the pixel area PA are shown in FIG. 2 since the pixels have the same structure and function.

Referring to FIGS. 2, 3A, 3B, and 3C, the display substrate 100 includes a first base substrate S1, a gate line GL, a first data line DL1, a second data line DL2, a first thin film transistor TR1, a second thin film transistor TR2, a pixel electrode PE, a first alignment layer 110, a first shielding electrode SCE1, and a second shielding electrode SCE2.

The first base substrate S1 may be a glass or plastic substrate. The gate line GL is disposed on the first base substrate S1, and is electrically connected to the first and second thin film transistors TR1 and TR2, to apply a gate signal to the first and second thin film transistors TR1 and TR2.

In the present exemplary embodiment, the pixel area PA includes a first sub-pixel area PA1 and a second sub-pixel area PA2. In this case, the pixel electrode PE includes a first sub-pixel electrode PE1 disposed in the first sub-pixel area PA1, and a second sub-pixel electrode PE2 disposed in the second sub-pixel area PA2.

The first and second data lines DL1 and DL2 are disposed on the first base substrate S1, and are insulated from the gate line GL. The first data line DL1 applies a first data signal to the first thin film transistor TR1, and the second data line DL2 applies a second data signal to the second thin film transistor TR2. The first data line DL1 extends along one side of the first and second sub-pixel electrodes PE1 and PE2, and the second data line DL2 extends along the other side of the first and second sub-pixel electrodes PE1 and PE2. Thus, the first and second sub-pixel electrodes PE1 and PE2 are arranged in the second direction D2 between the first and second data lines DL1 and DL2.

The first thin film transistor TR1 is electrically connected to the gate line GL, the first data line DL1, and the first sub-pixel electrode PE1. Thus, when the first thin film transistor TR1 is turned on in response to the gate signal, the first data signal is applied to the first sub-pixel electrode PE1.

The first thin film transistor TR1 includes a first gate electrode GE1, a first active pattern AP1, a first source electrode SE1, and a first drain electrode DE1. The first gate electrode GE1 is branched from the gate line GL, and the first active pattern AP1 is disposed on the first gate electrode GE1 while a first insulating layer L1 is disposed between the first active pattern AP1 and the first gate electrode GE1. The first source electrode SE1 is branched from the first data line DL1 to overlap with the first active pattern AP1, and the first drain electrode DE1 is spaced apart from the first source electrode SE1 to overlap with the first active pattern AP1.

A second insulating layer L2 covers the first and second thin film transistors TR1 and TR2, and a third insulating layer L3 is disposed on the second insulating layer L2 to relieve a step difference between the first and second thin film transistors TR1 and TR2.

The second thin film transistor TR2 is electrically connected to the gate line GL, the second data line DL2, and the second sub-pixel electrode PE2. Thus, when the second thin film transistor TR2 is turned on in response to the gate signal, the second data signal is applied to the second sub-pixel electrode PE2.

The second thin film transistor TR2 includes a second gate electrode GE2, a second active pattern AP2, a second source electrode SE2, and a second drain electrode DE2. The second gate electrode GE2 is branched from the gate line GL, and the second active pattern AP2 is disposed on the second gate electrode GE2, while the first insulating layer L1 is disposed between the second active pattern AP2 and the second gate electrode GE2. The second source electrode SE2 is branched from the second data line DL2 to overlap with the second active pattern AP2, and the second drain electrode DE2 is spaced apart from the second source electrode SE2 to overlap with the second active pattern AP2.

The first and second sub-pixel electrodes PE1 and PE2 are disposed on the third insulating layer L3. The first and second sub-pixel electrodes PE1 and PE2 make contact with the first and second drain electrodes DE1 and DE2, respectively, through contact holes formed through the second and third insulating layers L2 and L3.

In the present exemplary embodiment, each of the first and second active patterns AP1 and AP2 may include a semiconductor material, such as amorphous silicon, crystalline silicon, etc. According to another exemplary embodiment, each of the first and second active patterns AP1 and AP2 may include an oxide semiconductor, e.g., IGZO, ZnO, $SnO_2$, $In_2O_3$, $Zn_2SnO_4$, $Ge_2O_3$, and $HfO_2$, or a compound semiconductor, e.g., GaAs, GaP, and InP.

When the first and second thin film transistors TR1 and TR2 are turned on in response to the gate signal, the first data signal is applied to the first sub-pixel electrode PE1 through the turned-on first thin film transistor TR1, and the second data signal is applied to the second sub-pixel electrode PE2 through the turned-on second thin film transistor TR2. Accordingly, when the level of the first data signal is different from the level of the second data signal, different gray scales are displayed in the first and second sub-pixel areas PA1 and PA2, respectively.

For example, in the present exemplary embodiment, the first and second thin film transistors TR1 and TR2 are connected to the gate line GL. According to another exemplary embodiment, the first and second thin film transistors TR1 and TR2 may be electrically connected to different gate lines in a one-to-one correspondence.

The first alignment layer 110 may be disposed above the first and second sub-pixel electrodes PE1 and PE2 to make contact with the liquid crystal layer LC. When no electric field is applied to the liquid crystal layer LC, liquid crystal molecules RM (shown in FIGS. 4A to 4D) of the liquid crystal layer LC are pre-tilted by the first alignment layer 110. Thus, when the electric field is applied to the liquid crystal layer LC, the liquid crystal molecules pre-tilted by the first alignment layer 110 are aligned in a direction substantially parallel to the display substrate 100, so that a response time of the liquid crystal molecules operated in response to the electric field may be improved.

The first and second shielding electrodes SCE1 and SCE2 are spaced apart from the first and second sub-pixel electrodes PE1 and PE2, and are disposed in a non-pixel area N-PA. The first and second shielding electrodes SCE1 and SCE2 extend in the second direction D2, and are respectively overlapped with the first and second data lines DL1 and DL2. The first and second sub-pixel electrodes PE1 and PE2 are arranged in the second direction D2 between the first and second shielding electrodes SCE1 and SCE2.

The first and second shielding electrodes SCE1 and SCE2 may form the same electric potential with a common electrode CE. For instance, when a voltage of about 5 volts is applied to the common electrode CE, the voltage of about 5 volts is applied to each of the first and second shielding electrodes SCE1 and SCE2. Thus, the first and second shielding electrodes SCE1 and SCE2 form the same electric potential with the common electrode CE.

According to the first shielding electrode SCE1, because the first shielding electrode SCE1 forms the same electric potential with the common electrode CE, as shown in FIG. 3C, a difference in electric potential between the first shielding electrode SCE1 and the common electrode CE does not occur. As a result, the liquid crystal molecules RM disposed between the first shielding electrode SCE1 and the common electrode CE are maintained in the alignment state determined by the first alignment layer 110 and a second alignment layer 310. Accordingly, a phase difference delay value of the light passing through the liquid crystal molecules RM disposed to correspond to the first shielding electrode SCE1 becomes almost zero. Therefore, the light may be absorbed by polarizing plates respectively attached to the display substrate 100 and the opposite substrate 300 and having absorption axes vertical to each other.

According to the material used to form the first and second shielding electrodes SCE1 and SCE2, the first and second shielding electrodes SCE1 and SCE2 may block the light in the non-pixel area N-PA instead of the light blocking layer BM. For example, the first and second shielding electrodes SCE1 and SCE2 may be formed of an opaque conductive material. Therefore, the light blocking layer BM may be omitted in the area of the non-pixel area N-PA, in which the first and second shielding electrodes SCE1 and SCE2 are disposed.

In the present exemplary embodiment, the first and second shielding electrodes SCE1 and SCE2 include a transparent conductive material, e.g., indium tin oxide. Thus, although at least one of the first and second shielding electrodes SCE1 and SCE2 may intrude on the first and second sub-pixel areas PA1 and PA2 due to the misalignment described with reference to FIGS. 1A to 1C, a deterioration in aperture ratio of the first and second sub-pixel areas PA1 and PA2 may be prevented as a result of the first and second shielding electrodes SCE1 and SCE2.

The first sub-pixel electrode PE1 includes a first horizontal trunk portion HS1, a second horizontal trunk portion HS2, a first vertical trunk portion VS1, a second vertical trunk portion VS2, and first, second, third, and fourth branch portions B1, B2, B3, and B4.

The first vertical trunk portion VS1 is connected to the first horizontal trunk portion HS1, edges of the first branch portions B1, and edges of the second branch portions B2, and the second vertical trunk portion VS2 is connected to the second horizontal trunk portion HS2, edges of the third branch portions B3, and edges of the fourth branch portions B4.

Each of the first and second vertical trunk portions VS1 and VS2 extends in the second direction D2 crossing the first direction D1. In other words, the second direction D2 may be substantially perpendicular to the first direction D1 when viewed in a plan view.

Figure 5:
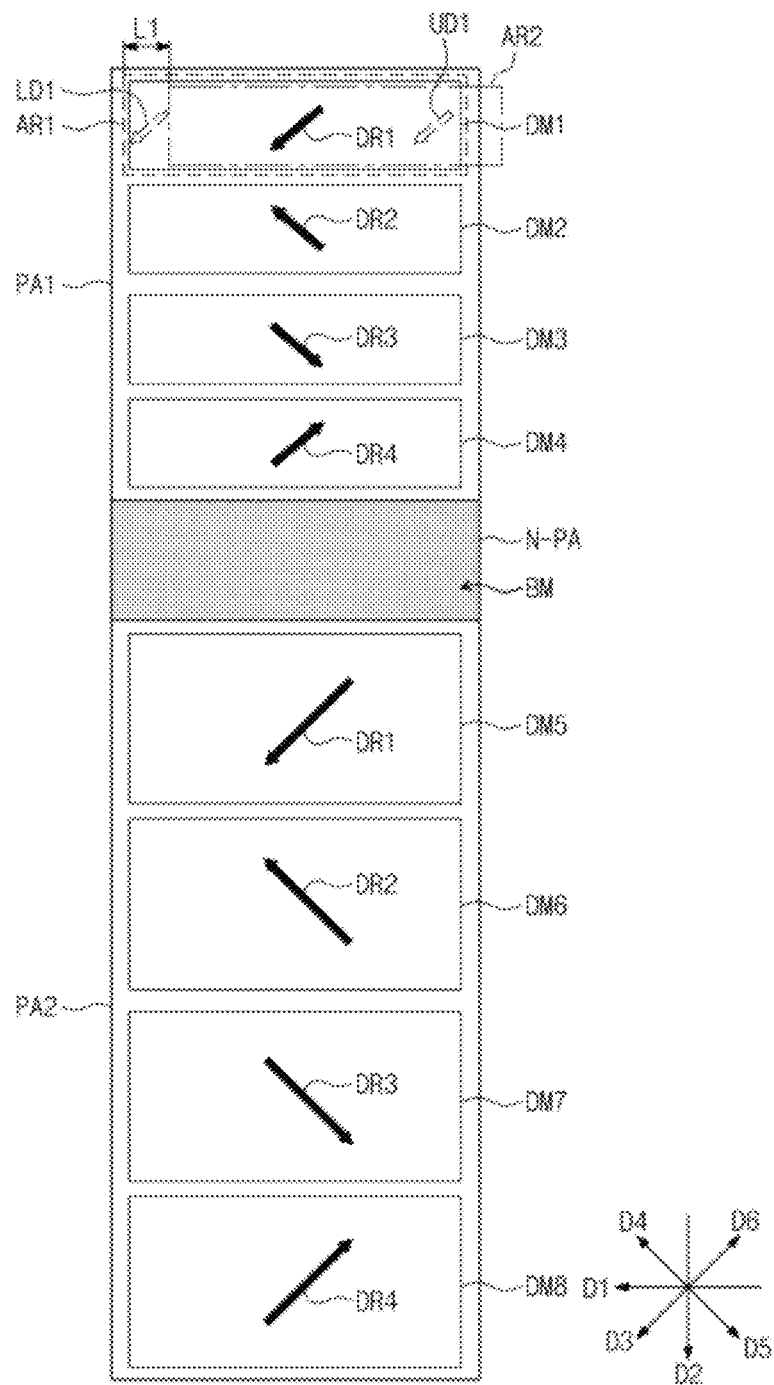
FIG. 5 is a view showing domains and liquid crystal alignment directions defined in a pixel area.

The first horizontal trunk portion HS1 is connected to the first vertical trunk portion VS1, the edges of the first branch portions B1, and the edges of the second branch portions B2. The first horizontal trunk portion HS1 is branched from a center portion of the first vertical trunk portion VS1 and extends in an opposite direction of the first direction D1. The first branch portions B1 have a symmetrical shape to that of the second branch portions B2 with respect to the first horizontal trunk portion HS1. Referring to FIG. 5, the first horizontal trunk portion HS1 is disposed between a first domain DM1 and a second domain DM2.

The second horizontal trunk portion HS2 is connected to the second vertical trunk portion VS2, edges of the third branch portions B3, and edges of the fourth branch portions B4. The second horizontal trunk portion HS2 is branched from a center portion of the second vertical trunk portion VS2 and extends in the first direction D1. The third branch portions B3 have a symmetrical shape to that of the fourth branch portions B4 with respect to the second horizontal trunk portion HS2. Referring to FIG. 5, the second horizontal trunk portion HS2 is disposed between a third domain DM3 and a fourth domain DM4.

A first portion of the first branch portions B1 is branched from the first horizontal trunk portion HS1, and a second portion of the first branch portions B1 is branched from the first vertical trunk portion VS1. In addition, each of the first branch portions B1 extends in a sixth direction D6 inclined with respect to the first and second directions D1 and D2 when viewed in a plan view, and the first branch portions B1 spaced apart from each other.

A first portion of the second branch portions B2 is branched from the first horizontal trunk portion HS1, and a second portion of the second branch portions B2 is branched from the first vertical trunk portion VS1. In addition, each of the second branch portions B2 extends in a fifth direction D6 inclined with respect to the first and second directions D1 and D2 when viewed in a plan view, and the second branch portions B2 are spaced apart from each other.

When viewed in a plan view, the fifth direction D5 may cross the sixth direction D6. For instance, the fifth and sixth directions D5 and D6 may be substantially perpendicular to each other when viewed in a plan view, and each of the fifth and sixth directions D5 and D6 forms an angle of about 45 degrees with either the first direction D1 or the second direction D2.

A first portion of the third branch portions B3 is branched from the second horizontal trunk portion HS2, and a second portion of the third branch portions B3 is branched from the second vertical trunk portion VS2. In addition, each of the third branch portions B3 extends in a fourth direction D4 inclined with respect to the first and second directions D1 and D2 in a plan view, and the third branch portions B3 are spaced apart from each other.

A first portion of the fourth branch portions B4 is branched from the second horizontal trunk portion HS2 and a second portion of the fourth branch portions B4 is branched from the second vertical trunk portion VS2. In addition, each of the fourth branch portions B4 extends in a third direction D3 inclined with respect to the first and second directions D1 and D2 in a plan view, and the fourth branch portions B4 are spaced apart from each other.

When viewed in a plan view, the fourth direction D4 may cross the third direction D3. For instance, the third and fourth directions D3 and D4 may be substantially perpendicular to each other when viewed in a plan view, and each of the third and fourth directions D3 and D4 forms an angle of about 45 degrees with the first direction D1 or the second direction D2.

The second sub-pixel electrode PE2 may differ in size from the first sub-pixel electrode PE1 while retaining the shape of the second sub-pixel electrode PE2 may have a shape similar to a shape of the first sub-pixel electrode PE1.

The second sub-pixel electrode PE2 includes third and fourth horizontal trunk portions HS3 and HS4, third and fourth vertical trunk portions VS3 and VS4, and fifth, sixth, seventh, and eighth branch portions B5, B6, B7, and B8.

The third vertical trunk portion VS3 extends in the second direction D2 and is connected to the third horizontal trunk portion HS3, edges of the fifth branch portions B5, and edges of the sixth branch portions B6. The fourth vertical trunk portion VS4 extends in the second direction D2, and is connected to the fourth horizontal trunk portion HS4, edges of the seventh branch portions B7, and edges of the eighth branch portions B8.

The third horizontal trunk portion HS3 is branched from the third vertical trunk portion VS3 to extend in a direction opposite that of the first direction D1, and the fourth horizontal trunk portion HS4 is branched from the fourth vertical trunk portion VS4 to extend in the first direction D1. In the present exemplary embodiment, the third horizontal trunk portion HS3 is branched from a center portion of the third vertical trunk portion VS3, and the fourth horizontal trunk portion HS4 is branched from a center portion of the fourth vertical trunk portion VS4.

A first portion of the fifth branch portions B5 is branched from the third horizontal trunk portion HS3, and a second portion of the fifth branch portions B5 is branched from the third vertical trunk portion VS3. In addition, each of the fifth branch portions B5 extends in the sixth direction D6 in a plan view, and the fifth branch portions B5 are spaced apart from each other.

A first portion of the sixth branch portions B6 is branched from the third horizontal trunk portion HS3, and a second portion of the sixth branch portions B6 is branched from the third vertical trunk portion VS3. In addition, each of the sixth branch portions B6 extends in the fifth direction D5 in a plan view, and the sixth branch portions B6 are spaced apart from each other.

A first portion of the seventh branch portions B7 is branched from the fourth horizontal trunk portion HS4, and a second portion of the seventh branch portions B7 is branched from the fourth vertical trunk portion VS4. In addition, each of the seventh branch portions B7 extends in the fourth direction D4 in a plan view, and the seventh branch portions B7 are spaced apart from each other.

A first portion of the eighth branch portions B8 is branched from the fourth horizontal trunk portion HS4, and a second portion of the eighth branch portions B8 is branched from the fourth vertical trunk portion VS4. In addition, each of the eighth branch portions B8 extends in the third direction D3 in a plan view, and the eighth branch portions B8 are arranged to be spaced apart from each other.

When the first to eighth branch portions B1 to B8 have the above-mentioned structure, first, second, third, and fourth domains DM1, DM2, DM3, DM4 (refer to FIG. 5) are defined in the first sub-pixel area PA1 and fifth, sixth, seventh, and eighth domains DM5, DM6, DM7, and DM8 (refer to FIG. 5) are defined in the second sub-pixel area PA2. Descriptions of the above will be described in detail with reference to FIGS. 4A to 4D, and FIG. 5.

In addition, in the case that the first to eighth domains DM1 to DM8 are defined in the first and second sub-pixel areas PA1 and PA2, the first sub-pixel electrode PE1 further includes a first domain connection part LP1, and the second sub-pixel electrode PE2 further includes a second connection part LP2, as shown in FIG. 2.

The first domain connection part LP1 is disposed between the second domain DM2 and the third domain DM3, and connects the second and third branch portions B2 and B3. The second domain connection part LP2 is disposed between the sixth domain DM6 and the seventh domain DM7, and connects the sixth and seventh branch portions B6 and B7. In the present exemplary embodiment, the first domain connection part LP1 is disposed at a center portion of a border area between the second and third domains DM2 and DM3, and the second domain connection part LP2 is disposed at a center portion of a border area between the sixth and seventh domains DM6 and DM7.

The opposite substrate 300 includes a second base substrate S2, the common electrode CE, the light blocking layer BM, a color filter CF, and the second alignment layer 310. The second base substrate S2 may be a glass or plastic substrate.

The common electrode CE is disposed on the second base substrate S2 so as to form the electric field to be applied to the liquid crystal layer LC in cooperation with the pixel electrode PE. The light blocking layer BM is disposed on the second base substrate S2 to block the light exiting from the liquid crystal layer LC. The light blocking layer BM is disposed in the non-pixel area N-PA disposed between the first sub-pixel area PA1 and the second sub-pixel area PA2, and extends in the first direction D1.

The color filter CF is disposed on the second base substrate S2 and faces the first and second sub-pixel areas PA1 and PA2 so as to filter the light exiting from the liquid crystal layer LC and provide a color to the light. For example, in the present exemplary embodiment, the color filter CF is disposed on the second base substrate S2. According to another exemplary embodiment, the color filter CF may be disposed on the first base substrate S1 to face the first and second sub-pixel areas PA1 and PA2.

The second alignment layer 310 is disposed above the common electrode CE and contacts the liquid crystal layer LC. When no electric field is applied to the liquid crystal layer LC, the liquid crystal molecules RM (refer to FIGS. 4A to 4D) of the liquid crystal layer LC are pre-tilted by the second alignment layer 310. Thus, when the electric field is applied to the liquid crystal layer LC, the liquid crystal molecules pre-tilted by the second alignment layer 310 are aligned in a direction substantially in parallel to the opposite substrate 300. Thus, a response time of the liquid crystal molecules operated in response to the electric field may be improved.

FIGS. 4A to 4D are perspective views showing the liquid crystal molecules aligned by the electric field formed between the display substrate and the opposite substrate, and FIG. 5 is a view showing the domains and the liquid crystal alignment directions defined in the pixel area.

Figure 4A:
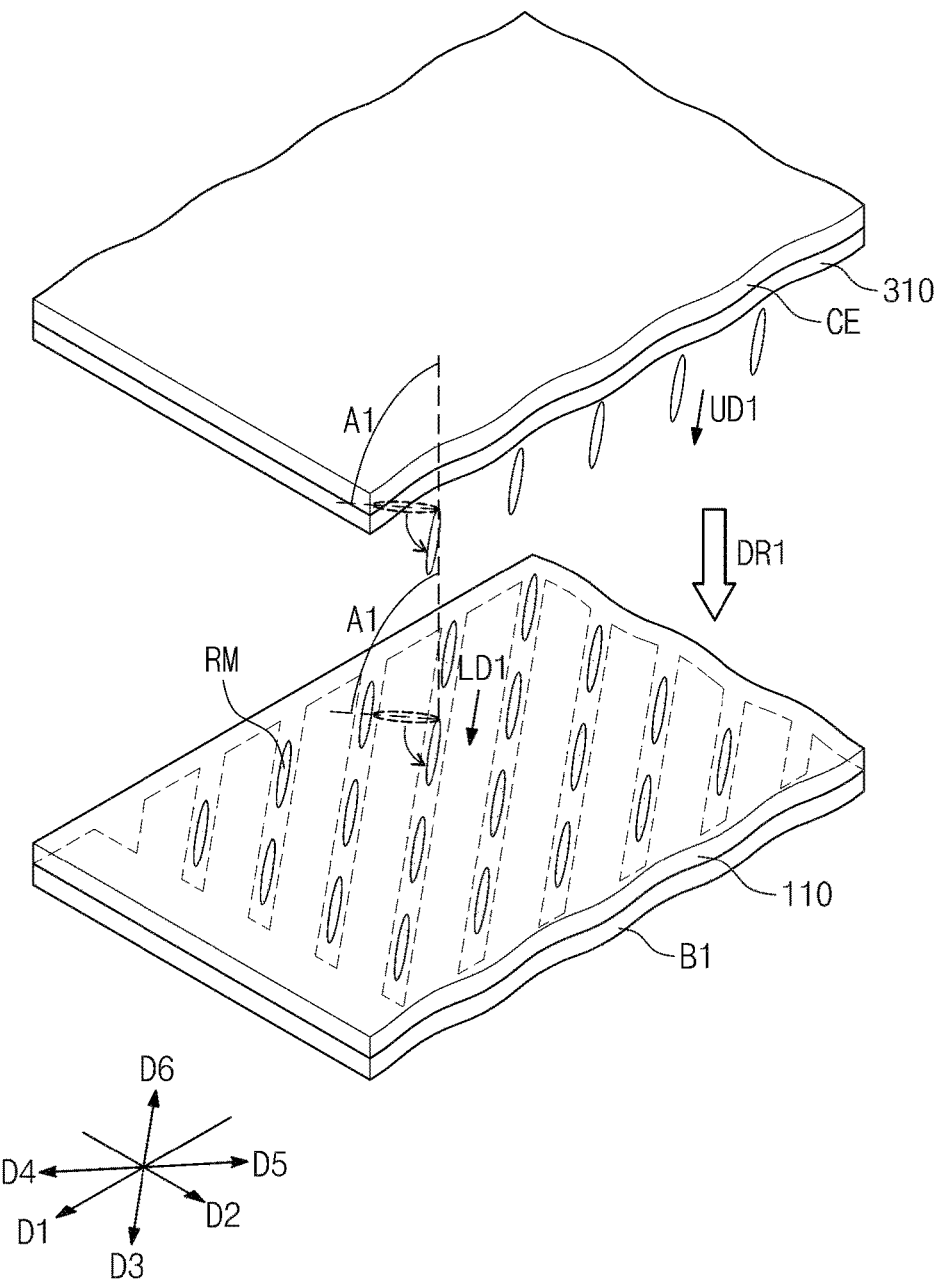
FIGS. 4A, 4B, 4C, and 4D are perspective views showing liquid crystal molecules aligned by an electric field formed between a display substrate and an opposite substrate.
Figure 4B:
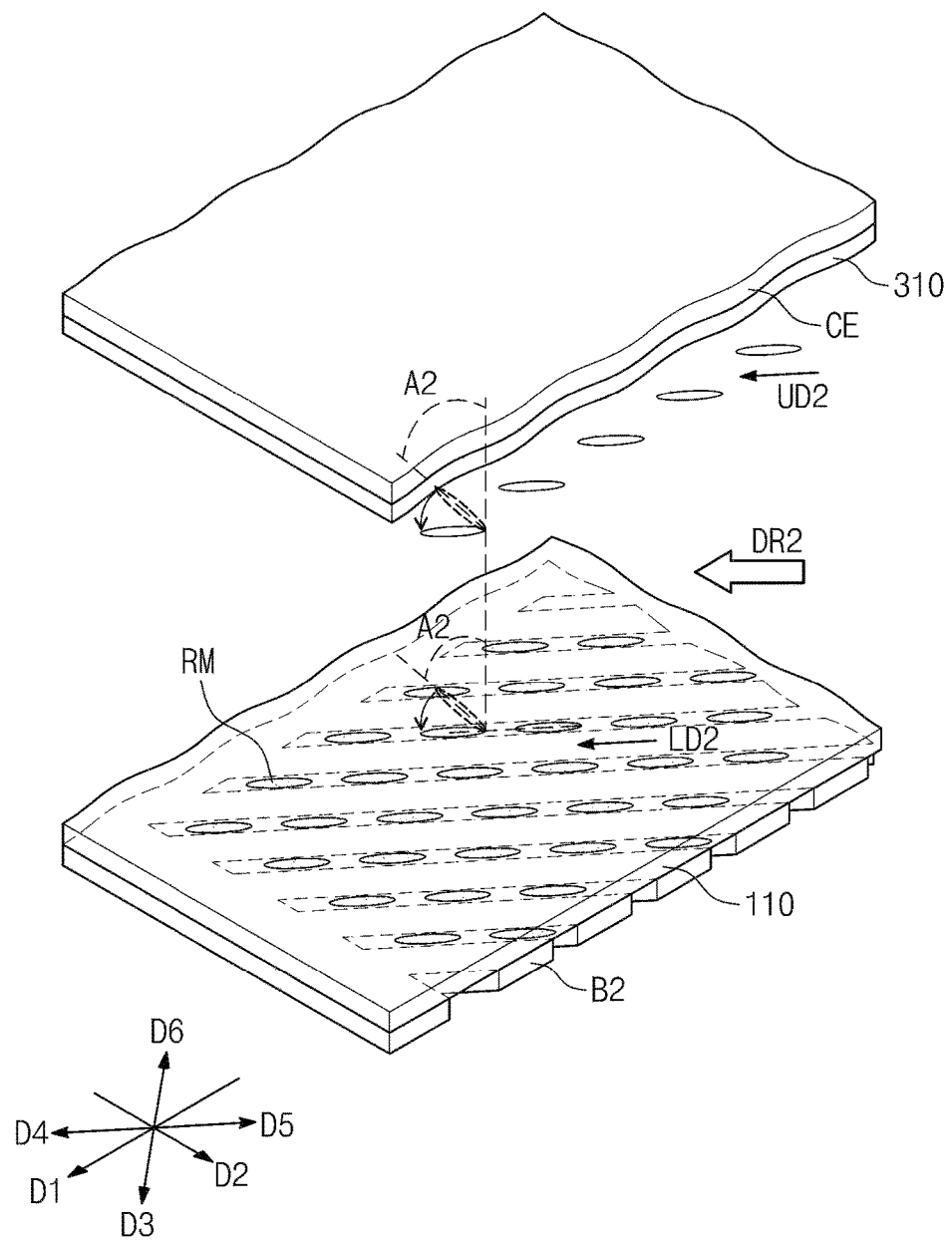
Figure 4C:
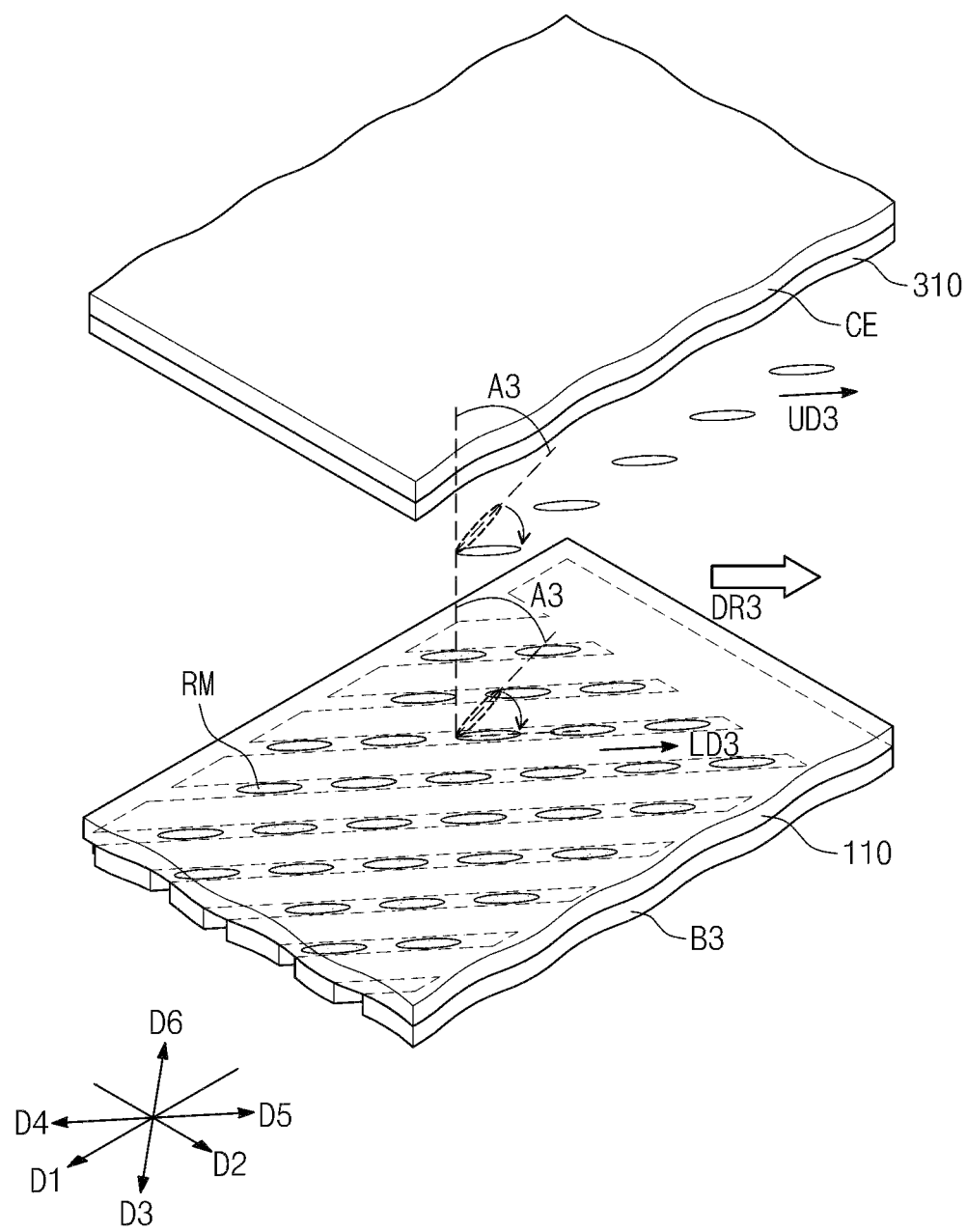
Figure 4D:
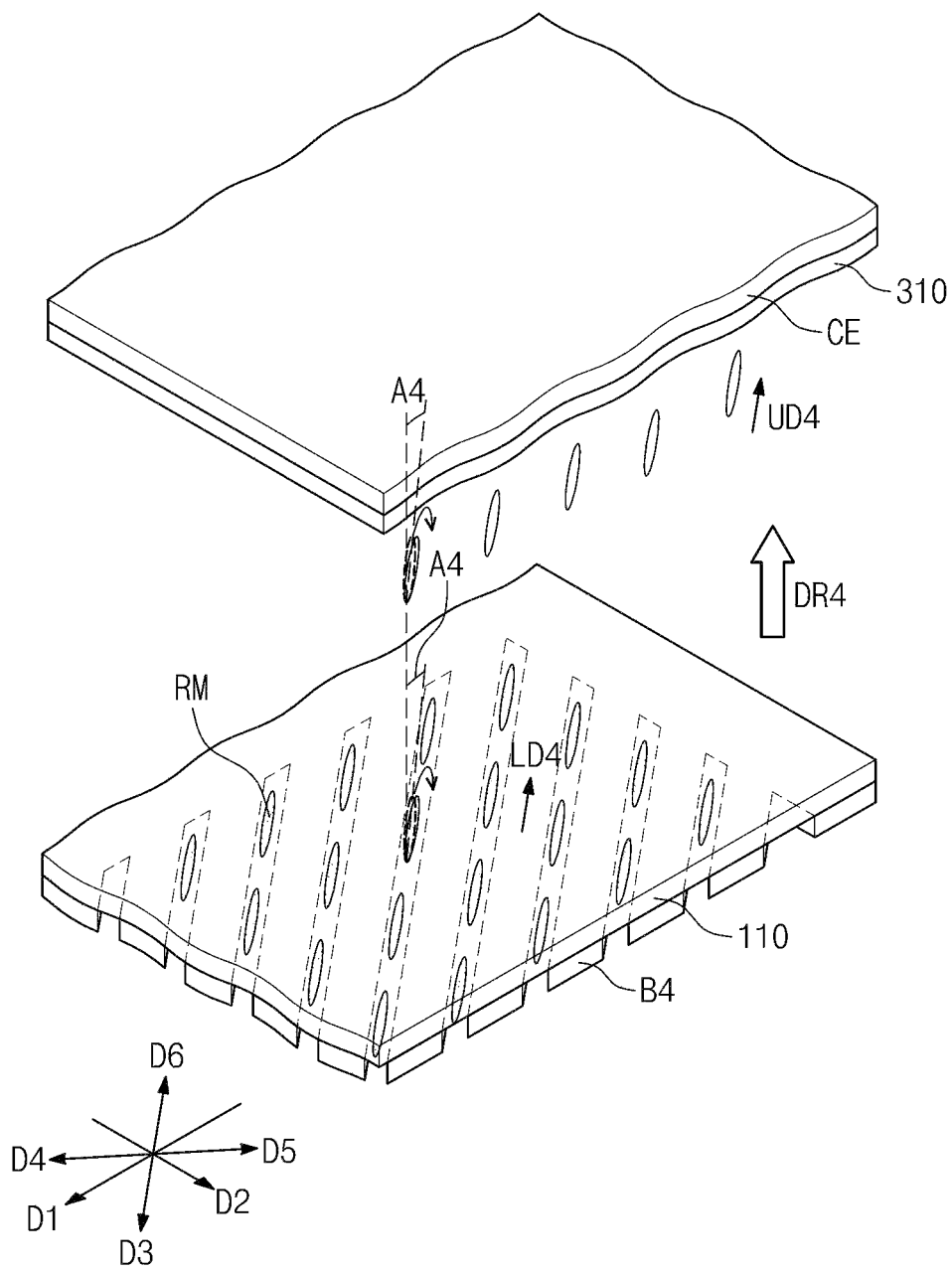

In more detail, FIG. 4A is a perspective view showing an alignment state of the liquid crystal molecules disposed in the first branch portions B1; FIG. 4B is a perspective view showing an alignment state of the liquid crystal molecules disposed in the second branch portions B2; FIG. 4C is a perspective view showing an alignment state of the liquid crystal molecules disposed in the third branch portions B3; and FIG. 4D is a perspective view showing an alignment state of the liquid crystal molecules disposed in the fourth branch portions B4.

Referring to FIGS. 4A and 5, the first branch portions B1 extend in the third direction D3. When no electric field is formed between the display substrate 100 (refer to FIG. 3A) and the opposite substrate 300 (refer to FIG. 3A), a first portion of the liquid crystal molecules RM, which is adjacent to the first alignment layer 110, is aligned and inclined at a first pre-tilt angle A1 by the first alignment layer 110, and a second portion of the liquid crystal molecules RM, which is adjacent to the second alignment layer 310, is aligned and inclined at the first pre-tilt angle A1 by the second alignment layer 310.

When a direction in which the liquid crystal molecules RM are aligned by the first alignment layer 110 on a plane surface is referred to as a first lower alignment direction LD1, and a direction in which the liquid crystal molecules RM are aligned by the second alignment layer 310 on a plane surface is referred to as a first upper alignment direction UD1, the first upper alignment direction UD1 and the first lower alignment direction LD1 are substantially parallel to the third direction D3. That is, the first lower alignment direction LD1 and the first upper alignment direction UD1 are the same.

When the electric field is formed, the liquid crystal molecules RM are further inclined by the electric field, and thus, the liquid crystal molecules RM are aligned in the third direction D3 to be substantially parallel to the first branch portions B1 in a plan view. That is, the liquid crystal molecules pre-tilted by the first and second alignment layers 110 and 130 are further inclined toward the third direction D3 by the electric field.

In contrast to the present exemplary embodiment, when the first upper alignment direction UD1 is different from the first lower alignment direction LD1, the liquid crystal molecules RM disposed adjacent to the first and second alignment layers 110 and 310 may be aligned in and inclined to different directions. In this case, the number of the liquid crystal molecules RM aligned in the third direction D3 by the electric field may be reduced, and thus, an alignment defect may occur. However, according to the present exemplary embodiment, the first upper alignment direction UD1 is substantially the same as the first lower alignment direction LD1, and the liquid crystal molecules RM are aligned in and inclined to the same direction. Therefore, the alignment defect may be prevented from occurring.

Accordingly, when an area in which the liquid crystal molecules RM are aligned by the first branch portions B1 is referred to as the first domain DM1, and a direction in which the liquid crystal molecules RM are aligned by the electric field in the first domain DM1 is referred to as a first liquid crystal alignment direction DR1, the first liquid crystal alignment direction DR1 in the first domain DM1 may correspond to the third direction D3, which is the same as the first lower alignment direction LD1 and the first upper alignment direction UD1.

Referring to FIGS. 4B and 5, the second branch portions B2 extend in the fourth direction D4. When no electric field is formed between the display substrate 100 (refer to FIG. 3A) and the opposite substrate 300 (refer to FIG. 3A), a first portion of the liquid crystal molecules RM, which is adjacent to the first alignment layer 110, is aligned and inclined at a second pre-tilt angle A2 by the first alignment layer 110, and a second portion of the liquid crystal molecules RM, which is adjacent to the second alignment layer 310, is aligned and inclined at the second pre-tilt angle A2 by the second alignment layer 310.

When a direction in which the liquid crystal molecules RM are aligned by the first alignment layer 110 in a plan view is referred to as a second lower alignment direction LD2, and a direction in which the liquid crystal molecules RM are aligned by the second alignment layer 310 in a plan view is referred to as a second upper alignment direction UD2, the second upper alignment direction UD2 and the second lower alignment direction LD2 are substantially parallel to the fourth direction D4. That is, the second lower alignment direction LD2 and the second upper alignment direction UD2 are the same.

When the electric field is formed, the liquid crystal molecules RM are further inclined by the electric field. Thus, the liquid crystal molecules RM are aligned in the fourth direction D4 to be substantially parallel to the second branch portions B2 in a plan view. Therefore, the second upper alignment direction UD2 and the second lower alignment direction LD2 are the same, and the liquid crystal molecules RM are aligned in the same direction in response to the electric field. As a result, a second liquid crystal alignment direction DR2 in the second domain DM2 may correspond to the fourth direction D4, which is the same as the second upper alignment direction UD2 and the second lower alignment direction LD2.

Referring to FIGS. 4C and 5, the third branch portions B3 extend in the fifth direction D5. When no electric field is formed between the display substrate 100 (refer to FIG. 3A) and the opposite substrate 300 (refer to FIG. 3A), a first portion of the liquid crystal molecules RM, which is adjacent to the first alignment layer 110, is aligned and inclined at a third pre-tilt angle A3 by the first alignment layer 110, and a second portion of the liquid crystal molecules RM, which is adjacent to the second alignment layer 310, is aligned and inclined at the third pre-tilt angle A3 by the second alignment layer 310.

When a direction in which the liquid crystal molecules RM are aligned by the first alignment layer 110 in a plan view is referred to as a third lower alignment direction LD3, and a direction in which the liquid crystal molecules RM are aligned by the second alignment layer 310 in a plan view is referred to as a third upper alignment direction UD3, the third upper alignment direction UD3 and the third lower alignment direction LD3 are substantially parallel to the fifth direction D5. That is, the third lower alignment direction LD3 and the third upper alignment direction UD3 are the same.

When the electric field is formed, the liquid crystal molecules RM are further inclined by the electric field. Thus, the liquid crystal molecules RM are aligned in the fifth direction D5 to be substantially parallel to the third branch portions B3 in a plan view. Therefore, the third upper alignment direction UD3 and the third lower alignment direction LD3 are the same, and the liquid crystal molecules RM are aligned in the same direction in response to the electric field. As a result, a third liquid crystal alignment direction DR3 in the third domain DM3 may correspond to the fifth direction D5, which is the same as the third upper alignment direction UD3 and the third lower alignment direction LD3.

Referring to FIGS. 4D and 5, the fourth branch portions B4 extend in the sixth direction D6. When no electric field is formed between the display substrate 100 (refer to FIG. 3A) and the opposite substrate 300 (refer to FIG. 3A), a first portion of the liquid crystal molecules RM, which is adjacent to the first alignment layer 110, is aligned and inclined at a fourth pre-tilt angle A4 by the first alignment layer 110, and a second portion of the liquid crystal molecules RM, which is adjacent to the second alignment layer 310, is aligned and inclined at the fourth pre-tilt angle A4 by the second alignment layer 310.

When a direction in which the liquid crystal molecules RM are aligned by the first alignment layer 110 in a plan view is referred to as a fourth lower alignment direction LD4, and a direction in which the liquid crystal molecules RM are aligned by the second alignment layer 310 in a plan view is referred to as a fourth upper alignment direction UD4, the fourth upper alignment direction UD4 and the fourth lower alignment direction LD4 are substantially parallel to the sixth direction D6. That is, the fourth lower alignment direction LD4 and the fourth upper alignment direction UD4 are the same.

When the electric field is formed, the liquid crystal molecules RM are further inclined by the electric field. Thus, the liquid crystal molecules RM are aligned in the sixth direction D6 to be substantially parallel to the fourth branch portions B4 in a plan view. Therefore, the fourth upper alignment direction UD4 and the fourth lower alignment direction LD4 are the same and the liquid crystal molecules RM are aligned in the same direction in response to the electric field. As a result, a fourth liquid crystal alignment direction DR4 in the fourth domain DM4 may correspond to the sixth direction D6, which is the same as the fourth upper alignment direction UD4 and the fourth lower alignment direction LD4.

According to the above, the first to fourth domains DM1 to DM4, which are sequentially arranged in the second direction D2, are defined in the first sub-pixel area PA1. In this case, the liquid crystal alignment directions in which the liquid crystal molecules RM are aligned are different from each other in the first to fourth domains DM1 to DM4. Accordingly, a viewing angle with respect to the first sub-pixel area PA1 may be widened. In addition, although the electric field is not formed, the alignment defect does not occur in the first to fourth domains DM1 to DM4 since the directions in which the liquid crystal molecules RM are aligned by the first alignment layer 110 in the first to fourth domains DM1 to DM4 are substantially the same as the directions in which the liquid crystal molecules RM are aligned by the second alignment layer 310.

Similar to the first sub-pixel area PA1, the fifth to eighth domains DM5 to DM8, which are sequentially arranged in the second direction D2, are defined in the second sub-pixel area PA2, and liquid crystal alignment directions in which the liquid crystal molecules RM are aligned are different from each other in the fifth to eighth domains DM5 to DM8. In addition, although the electric field is not formed, the alignment defect does not occur in the fifth to eighth domains DM5 to DM8, since the directions in which the liquid crystal molecules RM are aligned by the first alignment layer 110 in the fifth to eighth domains DM5 to DM8 are substantially the same as the directions in which the liquid crystal molecules RM are aligned by the second alignment layer 310.

Hereinafter, the effect generated when the first to eighth domains DM1 to DM8 are defined in the first and second sub-pixel areas PA1 and PA2 will be described in detail with reference to the first domain DM1 and the second domain DM2.

Referring to FIGS. 1C, 4A, and 5, misalignment may occur between the display substrate 100 and the opposite substrate 300 when the curved display device 500 is curved along the first direction D1. As a result of this misalignment, the display substrate 100 and the opposite substrate 300 may be dislocated to each other by a first length L1.

However, because the first to eighth domains DM1 to DM8 are arranged in the second direction D2 to be substantially perpendicular to the first direction D1 according to the present exemplary embodiment, the alignment defect caused by the misalignment does not occur in the first domain DM1.

In more detail, when an area in which the liquid crystal molecules RM are aligned by the first alignment layer 110 disposed on the display substrate 100 is referred to as a lower alignment area AR1, and an area in which the liquid crystal molecules RM are aligned by the second alignment layer 310 disposed on the opposite substrate 300 is referred to as an upper alignment area AR2, the liquid crystal molecules RM are aligned in the first lower alignment direction LD1 in the lower alignment area AR1 and are aligned in the first upper alignment direction UD1 in the upper alignment area AR2. In this case, when the opposite substrate 300 is shifted by the first length L1 as a result of misalignment, a position of the lower alignment area AR1 substantially matches with a position of the first domain DM1, but a position of the upper alignment area AR2 is shifted to the first direction D1 from the position of the first domain DM1 by the first length L1.

In the present exemplary embodiment, even though the opposite substrate 300 is shifted and the position of the lower alignment area AR1 does not partially match with the position of the upper alignment area AR2, the lower alignment area AR1 is overlapped with the upper alignment area AR2 in the first domain DM1. That is, the lower alignment area AR1 is not overlapped with other upper alignment areas aligned in a direction different from that of the upper alignment area AR2.

Therefore, the alignment defect caused by overlapping of the upper alignment area and the lower alignment area, which are aligned in different directions, may be prevented from occurring. Thus, reduction in the transmittance of the light passing through the first domain DM1 may be prevented.

According to the structure of the first to eighth domains DM1 to DM8 described above, the third and fourth domains DM3 and DM4 are sequentially arranged in the second direction D2 and disposed adjacent to the light blocking layer BM, and the fifth and sixth domains DM5 and DM6 face the third and fourth domains DM3 to DM4 while the light blocking layer BM is disposed between the fifth and sixth domains DM5 and DM6 and the third and fourth domains DM3 and DM4.

In the present exemplary embodiment, the third, fourth, first, and second liquid crystal alignment directions DR3, DR4, DR1, and DR2, which are respectively defined in the third to sixth domains DM3 to DM6, are different from each other, the third and fourth liquid crystal alignment directions DR3 and DR4 are oriented toward a first side E1 of the display area DA (refer to FIG. 6), and the first and second liquid crystal alignment directions DR1 and DR2 are oriented toward a second side E2 (refer to FIG. 7) of the display area. In an exemplary embodiment, first to fourth domains DM1 to DM4 each have smaller areas than fifth to eighth domains DM5 to DM8, as shown in FIG. 5.

When the first to fourth liquid crystal alignment directions DR1 to DR4 are defined as described above, a horizontal line may be prevented from occurring in the display area. Descriptions on the above will be described in detail with reference to FIGS. 6 and 7.

Figure 6:
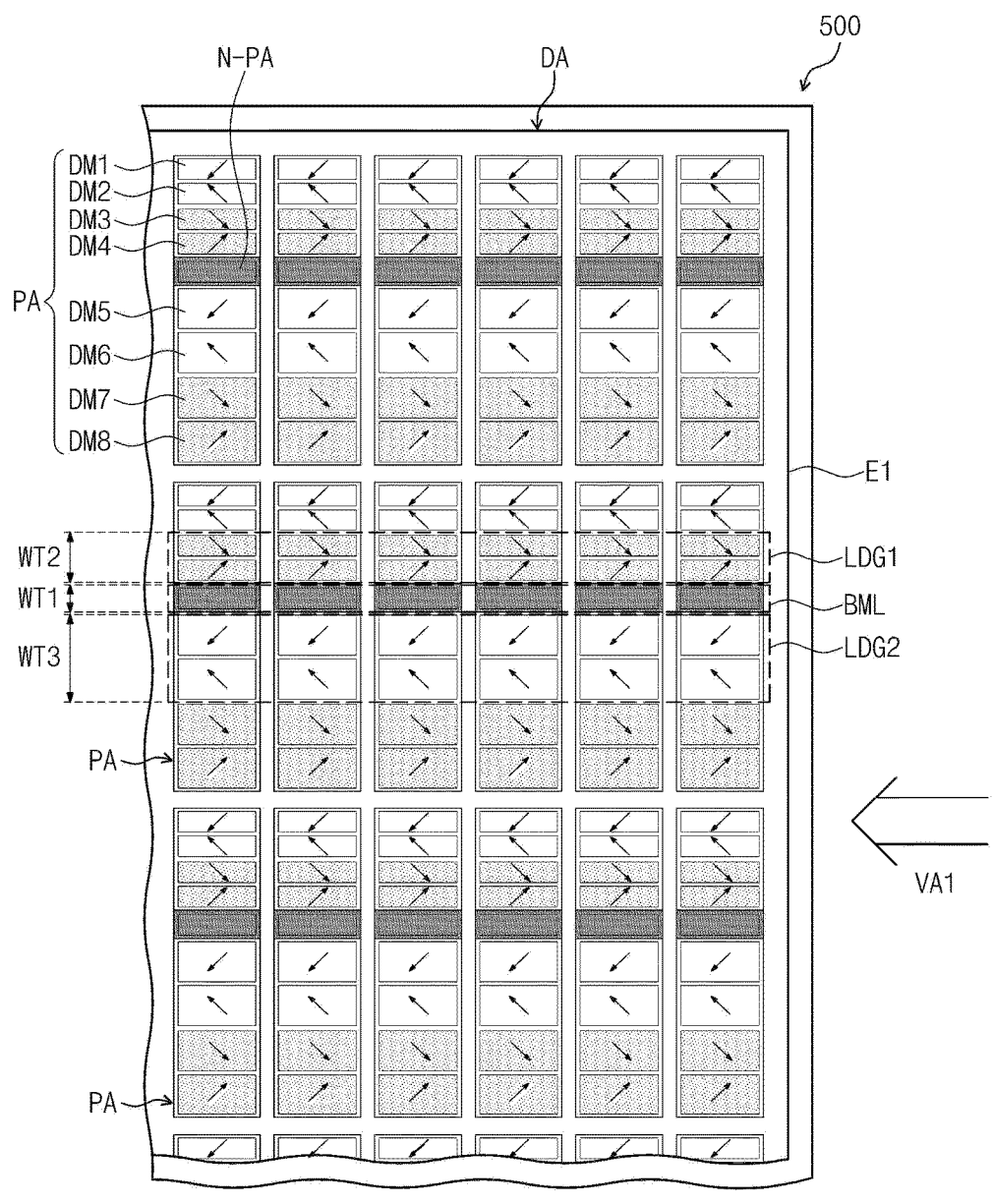
FIG. 6 is an enlarged plan view showing a portion of a display area of the curved display device shown in FIG. 1B.
Figure 6:
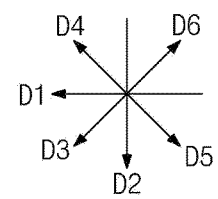

FIG. 6 is an enlarged view showing a portion of the display area of the curved display device shown in FIG. 1B. In detail, FIG. 6 shows a first side E1 of the display area DA.

Referring to FIGS. 5 and 6, the pixel areas PA are defined in the display area DA of the curved display device 500. As described with reference to FIG. 5, the first to eighth domains DM1 to DM8 are defined in each of the pixel areas PA, and the non-pixel area N-PA is defined between the fourth domain DM4 and the fifth domain DM5.

The pixel areas PA are arranged in a matrix in the display area DA. Thus, a line light blocking layer group BML, which includes light blocking layers arranged in the first direction D1 in the non-pixel area N-PA and including the light blocking layer BM (refer to FIG. 2), has a band shape having a first width WT1.

A first line domain group LDG1, including the third and fourth domains DM3 and DM4, which are arranged in the first direction D1, is defined in the pixel areas PA. A second line domain group LDG2, including the fifth and sixth domains DM5 and DM6, which are arranged in the first direction D1, is defined in the pixel areas PA. In this case, the first line domain group LDG1 has a band shape having a second width WT2, and the second line domain group LDG2 has a band shape having a third width WT3.

When the first and second line domain groups LDG1 and LDG2 are defined as described above, the liquid crystal alignment directions DR3 and DR4 (refer to FIG. 5) of the first line domain group LDG1 are oriented toward the first side E1 of the display area DA. On the contrary, the liquid crystal alignment directions DR1 and DR2 (refer to FIG. 5) of the second line domain group LDG2 are toward the second side E2 (refer to FIG. 7), which faces the first side E1 of the display area DA.

Therefore, a refractive anisotropy of the liquid crystal molecules disposed in the first line domain group LDG1 may be different from a refractive anisotropy of the liquid crystal molecules disposed in the second line domain group LDG2, in accordance with the viewing angle at which the user sees the display area DA. As a result, grayscale level displayed in the first line domain group LDG1 may be different from a grayscale level displayed in the second line domain group LDG2. For instance, as shown in FIG. 6, when the user sees the display area DA at a first viewing angle VA1, the grayscale level of the image displayed in the first line domain group LDG1 may be darker than the f grayscale level of the image displayed in the second line domain group LDG2.

In this case, even though the first line domain group LDG1 and the second line domain group LDG2 are adjacent to the line light blocking layer group BML, the grayscale level of the image displayed in the second line domain group LDG2 becomes brighter than the grayscale level of the image displayed in the first line domain group LDG1 and the line light blocking layer group BML. Thus, a width of the band in which the grayscale level of the image is relatively dark is defined as a sum of the first width WT1 and the second width WT2 among the line light blocking layer BML, the first line domain group LDG1, and the second line domain group LDG2.

In contrast to the present exemplary embodiment, when the liquid crystal alignment directions in the first and second line domain groups LDG1 and LDG2 are oriented toward the first side E1, the grayscale levels of the image displayed in the first and second line domain groups LDG1 and LDG2 are the same. In this case, a width of the band in which the grayscale level of the image is relatively dark is defined as a sum of the first, second, and third widths WT1, WT2, and WT3. Thus, the width of the band in which the grayscale level of the image is relatively dark becomes greater by the third width WT3 compared to the present exemplary embodiment. As a result, the band having the relatively dark grayscale level may be perceived by the user in accordance with the viewing angle and a viewing distance.

That is, according to the present exemplary embodiment, the width of the band, in which the grayscale level of the image is relatively dark, is controlled by adjusting at least one of the first width WT1 and the second width WT2 without considering the third width WT3. Accordingly, the width of the band defined by the sum of the first and second widths WT1 and WT2 may be designed to be smaller than the width perceived by the user.

Figure 7:
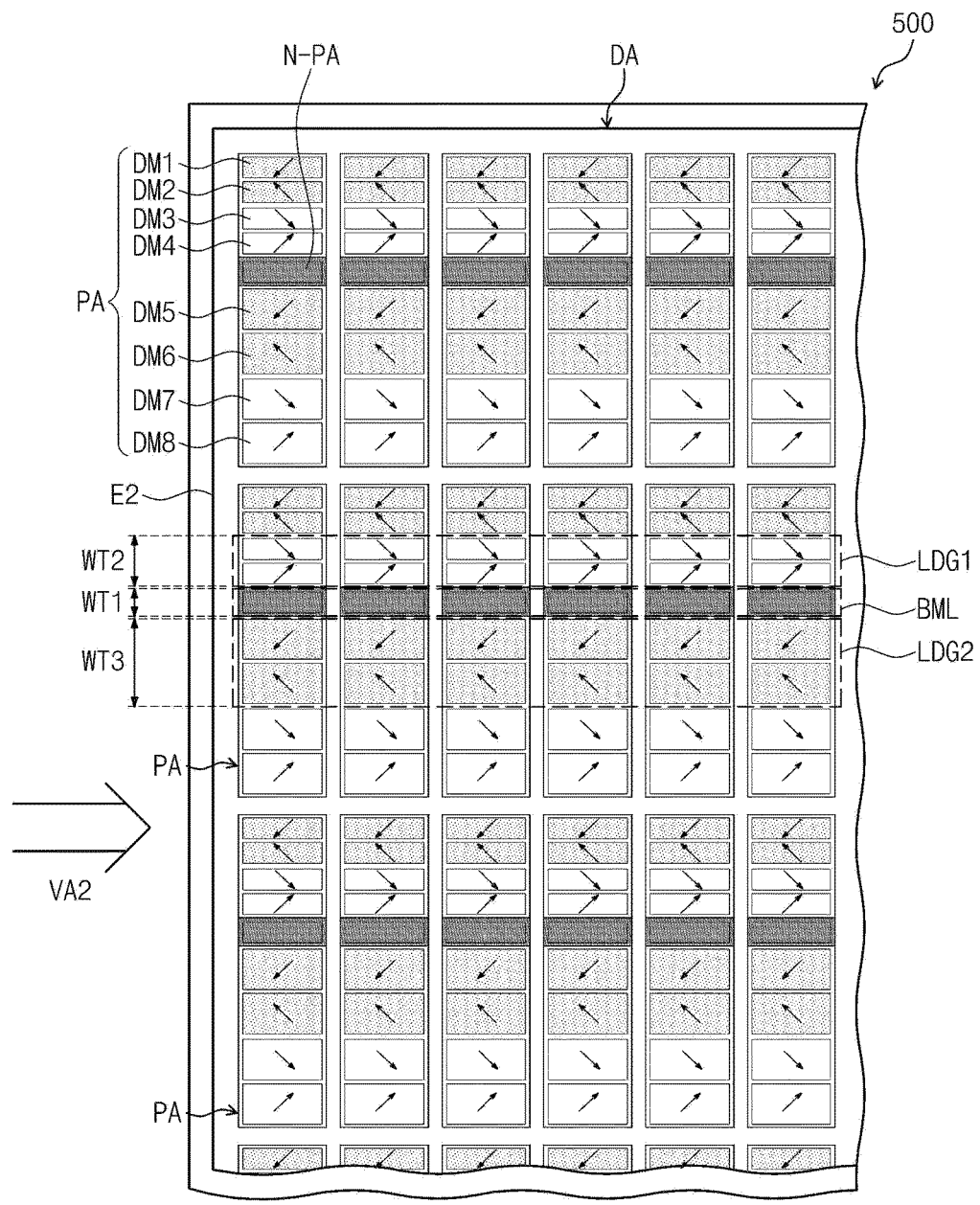
FIG. 7 is an enlarged plan view showing a portion of the display area of the curved display device shown in FIG. 1B.
Figure 7:
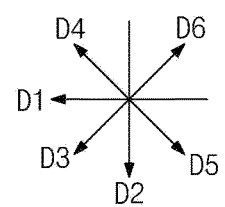

FIG. 7 is an enlarged view showing a portion of the display area of the curved display device shown in FIG. 1B. In detail, FIG. 7 shows the second side E2 of the display area DA.

Referring to FIGS. 5, 6, and 7, in contrast to the exemplary embodiment described with reference to FIG. 6, when the user sees the display area DA at a second viewing angle VA2, the grayscale level of the image displayed in the second line domain group LDG2 may be darker than the grayscale level of the image displayed in the first line domain group LDG1 in FIG. 7, and the grayscale level of the image displayed in the first line domain group LDG1 may be brighter than the grayscale level of the image displayed in each of the line light blocking layer group BML and the second line domain group LDG2. Thus, a width of the band, in which the grayscale level of the image is relatively dark, is defined by a sum of the first width WT1 and the third width WT3 among the line light blocking layer group DML, the first line domain group LDG1, and the second line domain group LDG2.

In contrast to the present exemplary embodiment, when the liquid crystal alignment directions in both the first and second line domain groups LDG1 and LDG2 are toward the second side E2, the grayscale level of the image displayed in the first line domain group LDG1 is substantially the same as that of the image displayed in the second line domain group LDG2. In this case, a width of the band, in which the grayscale level of the image is relatively dark, is defined by a sum of the first, second, and third widths WT1, WT2, and WT3. Thus, the width of the band in which the grayscale level of the image is relatively dark becomes greater by the second width WT2 compared to the present exemplary embodiment. As a result, the band having the relatively dark grayscale level may be perceived by the user in accordance with the viewing angle and a viewing distance.

However, according to the present exemplary embodiment, the width of the band having the relatively dark grayscale level is controlled by adjusting at least one of the first width WT1 and the third width WT3 without considering the second width WT2. Accordingly, the width of the band defined by the sum of the first and third widths WT1 and WT3 having the relatively dark grayscale level may be designed to be smaller than the width perceived by the user.

According to the exemplary embodiments described above, since the domains defined in each pixel area are arranged in a direction crossing the direction in which the display substrate and the opposite substrate are curved, reduction in the display quality of the curved display device may be prevented even though misalignment may occur between the display substrate and the opposite substrate.

In addition, a horizontal line, caused by the viewing angle of the user, may occur along the curved direction of the display substrate and the opposite substrate. However, a width of the horizontal line may be minimized by controlling liquid crystal alignment directions in the domains disposed adjacent to the light blocking layer. Thus, reduction in the display quality of the curved display device as a result of the presence of the horizontal line may be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A curved display device, comprising:
   a display substrate comprising pixel areas defined in a display area, the display area being curved along a first direction when viewed in a plan view;
   an opposite substrate facing the display substrate, coupled to the display substrate, and curved along the first direction together with the display substrate; and
   a liquid crystal layer disposed between the display substrate and the opposite substrate;
   a pixel electrode disposed in each of the pixel areas;
   a common electrode disposed on the opposite substrate and configured to form an electric field in cooperation with the pixel electrode; and
   a light blocking layer disposed on one of the display substrate and the opposite substrate and configured to block light,
   wherein:
   a plurality of domains is defined in each of the pixel areas, the domains being arranged in a single column in a second direction crossing the first direction for each pixel area, all of the domains are parallel to each other, and each of the domains has a long side parallel to the first direction;
   liquid crystal molecules in a first set of two domains, which are sequentially arranged and disposed adjacent to the light blocking layer among the domains, are aligned in a direction toward a first side of the display area;
   liquid crystal molecules in a second set of two domains, which face the first set of two domains while the light blocking layer is disposed between the first and second sets of two domain, are aligned in a direction toward a second side of the display area wherein each of the domains in the first set has the same width, wherein each of the domains in the second set has the same width, and wherein the first width is smaller than the second width;
   a long side of each pixel area is parallel to the second direction;
   columns of domains adjacent to each other in the first direction have a same domain arrangement.

2. The curved display device of claim 1, wherein the first and second sides of the display area face each other.

3. The curved display device of claim 2, wherein the display area has a curved shape curved along the first direction.

4. The curved display device of claim 3, wherein the first direction is substantially perpendicular to the second direction.

5. The curved display device of claim 1, wherein portions of the pixel electrode extend in a direction inclined with respect to the first and second directions when viewed in a plan view so as to define the domains.

6. The curved display device of claim 1, wherein each of the pixel areas comprises a first sub-pixel area and a second sub-pixel area, which are arranged in the second direction, and the light blocking layer is disposed between the first sub-pixel area and the second sub-pixel area.

7. The curved display device of claim 6, wherein:
   liquid crystal alignment directions of the liquid crystal molecules in the domains defined in the first sub-pixel area are different from each other; and
   liquid crystal alignment directions of the liquid crystal molecules in the domains defined in the second sub-pixel area are different from each other.

8. The curved display device of claim 6, wherein the pixel electrode comprises:
   a first sub-pixel electrode disposed in the first sub-pixel area; and
   a second sub-pixel electrode disposed in the second sub-pixel area,
   wherein the first sub-pixel electrode, the light blocking layer, and the second sub-pixel electrode are sequentially arranged in the second direction in the pixel area.

9. The curved display device of claim 8, wherein the display substrate further comprises:
   a first data line electrically connected to the first sub-pixel electrode and configured to apply a first data signal to the first sub-pixel electrode; and
   a second data line electrically connected to the second sub-pixel electrode and configured to apply a second data signal different from the first data signal to the second sub-pixel electrode.

10. The curved display device of claim 8,
    wherein:
    the domains comprise first, second, third, and fourth domains defined in the first sub-pixel area, and fifth, sixth, seventh, and eighth domains defined in the second sub-pixel electrode;
    the first sub-pixel electrode comprises first branch portions disposed in the first domain, second branch portions disposed in the second domain, third branch portions disposed in the third domain, and fourth branch portions disposed in the fourth domain;
    the second sub-pixel electrode comprises fifth branch portions disposed in the fifth domain, sixth branch portions disposed in the sixth domain, seventh branch portions disposed in the seventh domain, and eighth branch portions disposed in the eighth domain; and
    the first to eighth branch portions extend in a direction inclined with respect to the first and second directions when viewed in a plan view.

11. The curved display device of claim 10, wherein the light blocking layer extends in the first direction.

12. The curved display device of claim 10, wherein the light blocking layer is disposed between the fourth domain and the fifth domain.

13. The curved display device of claim 10, wherein:
    liquid crystal alignment directions of the liquid crystal molecules aligned by the electric field in the first, second, seventh, and eighth domains are different from each other; and
    liquid crystal alignment directions of the liquid crystal molecules aligned by the electric field in the third, fourth, fifth, and sixth domains are different from each other.

14. The curved display device of claim 10, wherein:
    liquid crystal alignment directions of the liquid crystal molecules aligned by the electric field in the first, second, third, and fourth domains are different from each other; and
    liquid crystal alignment directions of the liquid crystal molecules aligned by the electric field in the fifth, sixth, seventh, and eighth domains are different from each other.

15. The curved display device of claim 10, wherein:
liquid crystal alignment directions of the liquid crystal molecules aligned by the electric field in the third and fourth domains are oriented toward the first side of the display area; and
liquid crystal alignment directions of the liquid crystal molecules aligned by the electric field in the fifth and sixth domains are oriented toward the second side of the display area facing the one side.

16. The curved display device of claim 8, wherein:
the display substrate further comprises shielding electrodes disposed in a non-pixel area spaced apart from the pixel electrode; and
each of the shielding electrodes forms a same electric potential with the common electrode.

17. The curved display device of claim 16, wherein:
each of the shielding electrodes extends in the second direction; and
the first and second sub-pixel electrodes are disposed between two shielding electrodes adjacent to each other among the shielding electrodes and arranged in the second direction.

18. The curved display device of claim 1, wherein:
the display substrate comprises a first alignment layer configured to align the liquid crystal molecules;
the opposite substrate comprises a second alignment layer configured to align the liquid crystal molecules; and
liquid crystal alignment directions of the liquid crystal molecules aligned by the first alignment layer are substantially the same as liquid crystal alignment directions of the liquid crystal molecules aligned by the second alignment layer in each of the domains.

19. The curved display device of claim 1, wherein the pixel areas are arranged in a matrix.

20. A curved display device, comprising:
a display substrate comprising pixel areas defined in a display area, the display area being curved along a first direction when viewed in a plan view;
an opposite substrate facing the display substrate, coupled to the display substrate, and curved along the first direction together with the display substrate; and
a liquid crystal layer disposed between the display substrate and the opposite substrate;
a pixel electrode disposed in each of the pixel areas;
a common electrode disposed on the opposite substrate and configured to form an electric field in cooperation with the pixel electrode; and
a light blocking layer disposed on one of the display substrate and the opposite substrate and configured to block light,
wherein:
domains are defined in each of the pixel areas, the domains being arranged in a single column in a second direction crossing the first direction for each pixel area, all of the domains are parallel to each other, and each of the domains has a long side parallel to the first direction; and
columns of domains adjacent to each other in the first direction have a same domain arrangement,
wherein, in each pixel area:
a first one of the domains is disposed closest to a first side of the light blocking layer;
a second one of the domains is disposed closest to an opposing second side of the light blocking layer;
liquid crystals in the first domain and the second domain are aligned in opposite directions by the electric field the first ones of the domains have the same width, the second ones of the domains have the same width, and wherein the first width is smaller than the second width; and
a long side of each pixel area is parallel to the second direction.

21. The curved display device of claim 20, wherein, in each pixel area:
a third one of the domains is disposed directly adjacent to the first domain;
a fourth one of the domains is disposed directly adjacent to the second domain;
liquid crystal molecules of the third domain are aligned substantially perpendicular to the liquid crystal molecules of the first domain; and
liquid crystal molecules of the fourth domain are aligned substantially perpendicular to the liquid crystal molecules of the second domain by the electric field.

22. The curved display device of claim 1, wherein each pixel area has four domains arranged in the second direction.

* * * * *